United States Patent
Fan et al.

(10) Patent No.: US 10,488,945 B2
(45) Date of Patent: Nov. 26, 2019

(54) COMMAND-LINE INTERFACE DISPLAYING METHOD AND APPARATUS

(71) Applicant: Huawei Technologies Co., Ltd., Shenzhen (CN)

(72) Inventors: Xianhui Fan, Chengdu (CN); Tao Wang, Shenzhen (CN); Yao Yu, Chengdu (CN); Yang Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 15/845,705

(22) Filed: Dec. 18, 2017

(65) Prior Publication Data
US 2018/0107285 A1 Apr. 19, 2018

Related U.S. Application Data

(63) Continuation of application No. PCT/CN2016/094667, filed on Aug. 11, 2016.

(30) Foreign Application Priority Data

Aug. 12, 2015 (CN) .......................... 2015 1 0493382

(51) Int. Cl.
*G06F 3/023* (2006.01)
*G06F 16/33* (2019.01)
(Continued)

(52) U.S. Cl.
CPC .............. *G06F 3/0233* (2013.01); *G06F 8/38* (2013.01); *G06F 9/451* (2018.02); *G06F 9/45512* (2013.01); *G06F 16/3331* (2019.01)

(58) Field of Classification Search
CPC .. G06F 16/3331; G06F 9/451; G06F 9/45512; G06F 8/38; G06F 3/0233
See application file for complete search history.

(56) References Cited

U.S. PATENT DOCUMENTS

2001/0052030 A1 12/2001 Shiraishi
2008/0155565 A1 6/2008 Poduri
(Continued)

FOREIGN PATENT DOCUMENTS

CN 1534460 A 10/2004
CN 101719844 A 6/2010
(Continued)

OTHER PUBLICATIONS

Foreign Communication From a Counterpart Application, European Application No. 16834679.9, Extended European Search Report dated Apr. 9, 2018, 9 pages.
(Continued)

*Primary Examiner* — Liliana Cerullo
(74) *Attorney, Agent, or Firm* — Conley Rose, P.C.

(57) ABSTRACT

A command-line interface (CLI) displaying method includes receiving a typed character, determining whether a character is displayed in a prompt information displaying area, deleting the character displayed in the prompt information displaying area when the character is displayed in the prompt information displaying area, and displaying information obtained by processing a command string currently displayed in a command line displaying area in the prompt information displaying area.

9 Claims, 7 Drawing Sheets

(51) Int. Cl.
    G06F 8/38      (2018.01)
    G06F 9/455     (2018.01)
    G06F 9/451     (2018.01)

(56) References Cited

U.S. PATENT DOCUMENTS

2009/0172541 A1   7/2009   Acedo et al.
2013/0263043 A1   10/2013  Sarbin

FOREIGN PATENT DOCUMENTS

| | | |
|---|---|---|
| CN | 101216768 B | 10/2010 |
| CN | 102043570 A | 5/2011 |
| CN | 103995740 A | 8/2014 |

OTHER PUBLICATIONS

Machine Translation and Abstract of Chinese Publication No. CN1534460, Oct. 6, 2004, 14 pages Machine Translation and Abstract of Chinese Publication No. CN101719844, Jun. 2, 2010, 12 pages.

Machine Translation and Abstract of Chinese Publication No. CN102043570, May 4, 2011, 15 pages.

Machine Translation and Abstract of Chinese Publication No. CN103995740, Aug. 20, 2014, 10 pages.

Foreign Communication From a Counterpart Application, PCT Application No. PCT/CN2016/094667, English Translation of International Search Report dated Nov. 14, 2016, 2 pages.

Machine Translation and Abstract of Chinese Publication No. CN101216768, Oct. 13, 2010, 24 pages.

Foreign Communication From a Counterpart Application, Chinese Application No. 201510493382.0, Chinese Office Action dated Mar. 5, 2019, 8 pages.

COMMAND-LINE INTERFACE DISPLAYING METHOD AND APPARATUS

CROSS-REFERENCE TO RELATED APPLICATIONS

This application is a continuation of International Patent Application No. PCT/CN2016/094667 filed on Aug. 11, 2016, which claims priority to Chinese Patent Application No. 201510493382.0 filed on Aug. 12, 2015. The disclosures of the aforementioned applications are hereby incorporated by reference in their entireties.

TECHNICAL FIELD

The present application relates to the field of computer technologies, and in particular, to a command-line interface (CLI) displaying method and apparatus.

BACKGROUND

A terminal on which CLI software is installed can display, on a CLI, a command typed by a user using a keyboard, and can display, on the CLI, an execution result generated by executing the command. Generally, the CLI software does not support a mouse, and the user needs to type the command using the keyboard. An interface provided by a network device such as a router, a terminal multiplexer, or a cable modem is generally a CLI. The user may query, set, maintain, and manage a service in the network device using the CLI.

In a related technology, a CLI usually includes a command line displaying area and a prompt information displaying area. The command line displaying area is used to display a command typed by a user using a keyboard, and the prompt information displaying area is used to display prompt information matching the command typed by the user. If the user presses a preset command matching key in a process of typing the command, a terminal can query, according to a command currently displayed in the command line displaying area, a word matching the command, and display corresponding prompt information in the prompt information displaying area. The prompt information includes the word matching the command. After the user completes typing of the command according to the prompt information and presses a preset command execution key, the terminal can execute the command displayed in the command line displaying area, generate an execution result, and display the execution result in the prompt information displaying area. In actual application, the preset command matching key is usually a Tab key, and the preset command execution key is usually an Enter key.

When the terminal on which the CLI software is installed displays the execution result on the CLI, the prompt information in the process of typing the command by the user is also displayed in the CLI. As a result, content displayed in the CLI is cumbersome, and the CLI has low display simplicity.

SUMMARY

To resolve a problem in other approaches, embodiments of the present application provide a CLI displaying method and apparatus. The technical solutions are as follows.

According to a first aspect, a CLI displaying method is provided, where the method includes receiving a typed character, determining whether a character is displayed in a prompt information displaying area, deleting the character displayed in the prompt information displaying area if the character is displayed in the prompt information displaying area, and displaying, in the prompt information displaying area, information obtained by processing a command string currently displayed in a command line displaying area.

With reference to the first aspect, in a first implementable manner of the first aspect, displaying, in the prompt information displaying area, information obtained by processing a command string currently displayed in a command line displaying area includes determining whether the typed character is a preset command execution character, executing a string updating process if the typed character is not the preset command execution character, where the string updating process includes obtaining a first command string currently displayed in the command line displaying area, obtaining, from a database, a first word set matching the first command string, determining whether a quantity of words that are included in the first word set is 1, updating the first command string with the word if the quantity of words that are in the first word set is 1, displaying the updated first command string in the command line displaying area, repeating the string updating process, until the quantity of words that are included in the first word set is not 1, and displaying the first word set in the prompt information displaying area.

With reference to the first implementable manner of the first aspect, in a second implementable manner of the first aspect, updating the first command string with the word includes determining whether the first command string includes a non-preset word, where the preset word is a word prestored in the database, replacing the non-preset word with the word if the first command string includes the non-preset word, and suffixing the first command string with the word if the first command string does not include the non-preset word.

With reference to the first implementable manner of the first aspect, in a third implementable manner of the first aspect, displaying, in the prompt information displaying area, information obtained by processing a command string currently displayed in a command line displaying area further includes executing a command indicated by the currently displayed command string if the typed character is the preset command execution character, and displaying an execution result in the prompt information displaying area.

According to a second aspect, a CLI displaying apparatus is provided, where the apparatus includes a receiving module configured to receive a typed character, a determining module configured to determine whether a character is displayed in a prompt information displaying area, a deletion module configured to delete the character displayed in the prompt information displaying area when the character is displayed in the prompt information displaying area, and a display module configured to display, in the prompt information displaying area, information obtained by processing a command string currently displayed in a command line displaying area.

With reference to the second aspect, in a first implementable manner of the second aspect, the display module includes a determining submodule configured to determine whether the typed character is a preset command execution character, an updating submodule configured to execute a string updating process when the typed character is not the preset command execution character, where the string updating process includes obtaining a first command string currently displayed in the command line displaying area, obtaining, from a database, a first word set matching the first command string, determining whether a quantity of words that are included in the first word set is 1, updating the first command string with the word if the quantity of words that are in the first word set is 1, displaying the updated first command string in the command line displaying area, and repeat the string updating process, until the quantity of words that are included in the first word set is not 1, and a first display submodule configured to display the first word set in the prompt information displaying area.

With reference to the first implementable manner of the second aspect, in a second implementable manner of the second aspect, the updating submodule is further configured to determine whether the first command string includes a non-preset word, where the preset word is a word prestored in the database, replace the non-preset word with the word if the first command string includes the non-preset word, and suffix the first command string with the word if the first command string does not include the non-preset word.

With reference to the first implementable manner of the second aspect, in a third implementable manner of the second aspect, the display module further includes an execution submodule configured to execute a command indicated by the currently displayed command string when the typed character is the preset command execution character, and a second display submodule configured to display an execution result in the prompt information displaying area.

Beneficial effects brought by the technical solutions provided in the embodiments of the present application are as follows.

According to the CLI displaying method and apparatus provided in the embodiments of the present application, after receiving a typed character, a terminal can delete a character displayed in a prompt information displaying area, and display, in the prompt information displaying area, information obtained by processing a command string currently displayed in a command line displaying area. Therefore, content displayed in a CLI is simplified, and simplicity of the CLI is achieved.

BRIEF DESCRIPTION OF DRAWINGS

To describe the technical solutions in the embodiments of the present application more clearly, the following briefly describes the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the present application clearer, the following further describes the embodiments of the present application in detail with reference to the accompanying drawings.

Figure 1:
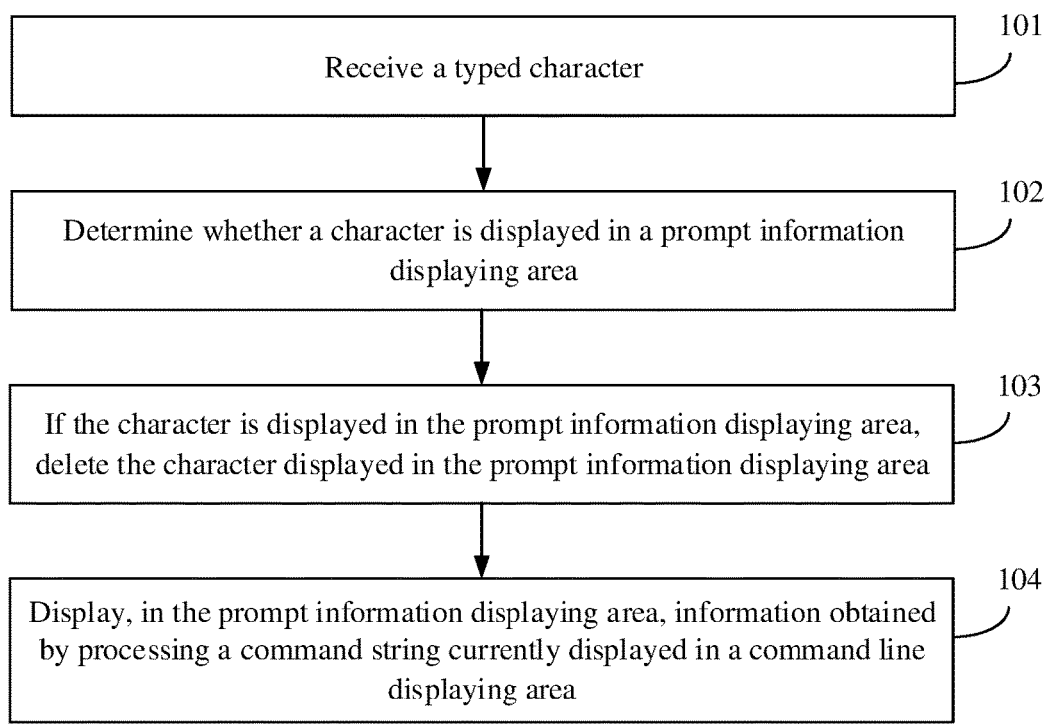
FIG. 1 is a flowchart of a CLI displaying method according to an embodiment of the present application.

An embodiment of the present application provides a CLI displaying method. Referring to FIG. 1, the method includes the following steps.

Step 101: Receive a typed character.

Step 102: Determine whether a character is displayed in a prompt information displaying area.

Step 103: If the character is displayed in the prompt information displaying area, delete the character displayed in the prompt information displaying area.

Step 104: Display, in the prompt information displaying area, information obtained by processing a command string currently displayed in a command line displaying area.

In conclusion, according to the CLI displaying method provided in this embodiment of the present application, after receiving a typed character, a terminal can delete a character displayed in a prompt information displaying area, and display, in the prompt information displaying area, information obtained by processing a command string currently displayed in a command line displaying area. Therefore, content displayed in a CLI is simplified, and simplicity of the CLI is achieved.

Optionally, displaying, in the prompt information displaying area, information obtained by processing a command string currently displayed in a command line displaying area includes determining whether the typed character is a preset command execution character, executing a string updating process if the typed character is not the preset command execution character, where the string updating process includes obtaining a first command string currently displayed in the command line displaying area, obtaining, from a database, a first word set matching the first command string, determining whether a quantity of words that are included in the first word set is 1, updating the first command string with the word if the quantity of words that are in the first word set is 1, displaying the updated first command string in the command line displaying area, repeating the string updating process, until the quantity of words that are included in the first word set is not 1, and displaying the first word set in the prompt information displaying area.

Optionally, updating the first command string with the word includes determining whether the first command string includes a non-preset word, where the preset word is a word prestored in the database, replacing the non-preset word with the word if the first command string includes the non-preset word, and suffixing the first command string with the word if the first command string does not include the non-preset word.

Optionally, displaying, in the prompt information displaying area, information obtained by processing a command string currently displayed in a command line displaying area further includes executing a command indicated by the currently displayed command string if the typed character is the preset command execution character, and displaying an execution result in the prompt information displaying area.

In conclusion, according to the CLI displaying method provided in this embodiment of the present application, after receiving a typed character, a terminal can delete a character displayed in a prompt information displaying area, and display, in the prompt information displaying area, information obtained by processing a command string currently displayed in a command line displaying area. Therefore, content displayed in a CLI is simplified, and simplicity of the CLI is achieved.

Figure 2A:
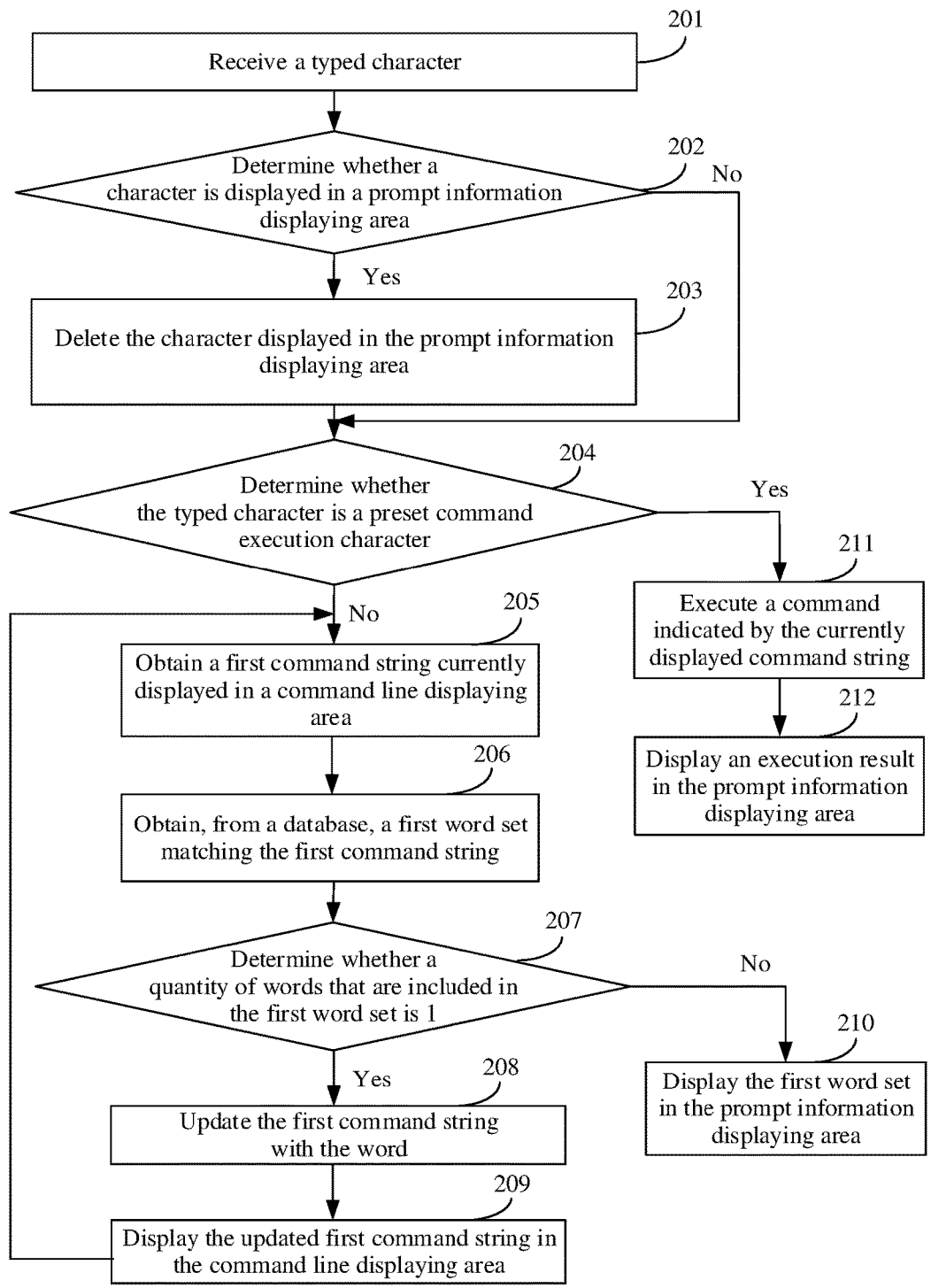
FIG. 2A is a flowchart of another CLI displaying method according to an embodiment of the present application.

An embodiment of the present application provides another CLI displaying method. Referring to FIG. 2A, the method includes the following steps.

Step 201: Receive a typed character.

Figure 2B:
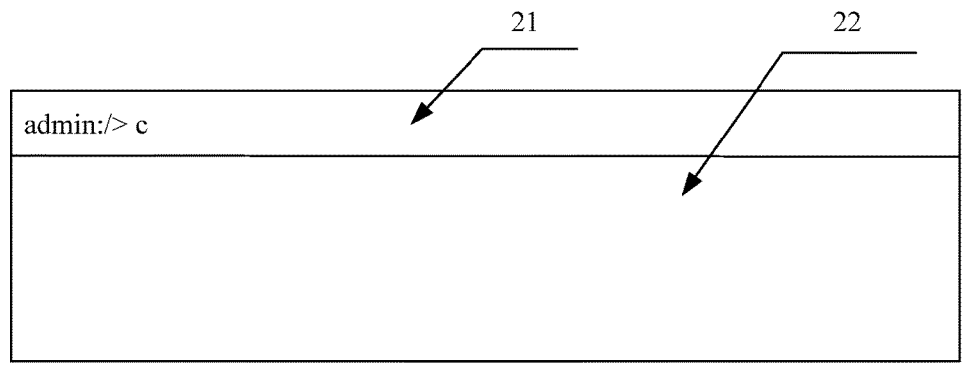
FIG. 2B is a schematic diagram of a CLI according to an embodiment of the present application.

In this embodiment of the present application, a terminal on which CLI software is installed can receive a character typed by a user using a keyboard. In addition, when the typed character is not a preset command execution character, the terminal may display the received typed character in a command line displaying area of a command-line display interface. For example, FIG. 2B is a schematic diagram of a CLI according to an embodiment of the present application. As shown in FIG. 2B, the CLI may include a command line displaying area 21 and a prompt information displaying area 22. Assuming that a character typed by the user using the keyboard is c, the terminal may receive the typed character c and display the typed character c in the command line displaying area 21.

It should be noted that, in actual application, the terminal may pre-store a special character. When the typed character received by the terminal is the special character, the terminal does not perform the following step, but continue performing step 201, that is, wait for subsequent typing of the user. For example, a key corresponding to the special character may be a space bar or a Tab key. In addition, a command termination character may be further preset in the terminal. When the terminal receives the command termination character, the terminal may terminate current typing of a command. For example, a key combination corresponding to the command termination character may be control key (Ctrl)+C.

Step 202: Determine whether a character is displayed in a prompt information displaying area.

If the character is displayed in the prompt information displaying area, step 203 is performed. If no character is displayed in the prompt information displaying area, the terminal may directly perform step 204. After receiving the typed character, to update the character displayed in the prompt information displaying area, the terminal may first determine whether the character is displayed in the prompt information displaying area. In this embodiment of the present application, an output buffering module for the prompt information displaying area may be disposed in the terminal. The character displayed in the prompt information displaying area is a character stored in the output buffering module. The terminal may determine whether the character is stored in the output buffering module in order to determine whether the character is displayed in the prompt information displaying area.

Step 203: Delete the character displayed in the prompt information displaying area.

If the character is displayed in the prompt information displaying area, the terminal may delete the character displayed in the prompt information displaying area such that the terminal can update the character displayed in the prompt information displaying area. In this embodiment of the present application, a write buffering module may be further disposed in the terminal. The write buffering module is connected to the output buffering module. The write buffering module is configured to receive the typed character and can send the typed character to the output buffering module. When the character is displayed in the prompt information displaying area, the terminal may automatically type several backspace characters into the write buffering module according to a size of the character stored in the output buffering module. After the write buffering module sends the several backspace characters to the output buffering module, the terminal may delete the character stored in the output buffering module, thereby deleting the character displayed in the prompt information displaying area.

Step 204: Determine whether the typed character is a preset command execution character.

If the typed character is not the preset command execution character, the following string updating process in step 205 to step 209 is performed. If the typed character is the preset command execution character, step 211 is performed.

The terminal pre-stores the preset command execution character. Generally, a key corresponding to the preset command execution character is an Enter key. For example, assuming that the key corresponding to the preset command execution character is the Enter key, the preset command execution character may be "\n" or "\r". After receiving the typed character, the terminal may first determine whether the typed character is the preset command execution character "\n" or "\r". If the typed character is not the preset command execution character "\n" or "\r", step 205 is performed. If the typed character is the preset command execution character "\n" or "\r", step 211 is performed.

Step 205: Obtain a first command string currently displayed in a command line displaying area.

When the typed character is not the preset command execution character, the terminal may automatically obtain the first command string currently displayed in the command line displaying area. For example, assuming that, as shown in FIG. 2B, the typed character received by the terminal is c, and because the typed character is not the preset command execution character "\n" or "\r", the terminal may obtain the first command string c currently displayed in the command line displaying area 21.

Step 206: Obtain, from a database, a first word set matching the first command string.

In this embodiment of the present application, a word refers to a constituent element that is prestored in the database to form a command statement, a command parameter, and a value of the command parameter. The word may be an English word, for example, "change", or may be a combination of a command parameter and a value of the command parameter, for example, "v1v2c_switch=on", and this is not limited in this embodiment of the present application. In this embodiment of the present application, the terminal on which the CLI software is installed stores multiple words that can form a command statement, a command parameter, and a value of a command parameter. For each word in the multiple words, the terminal further stores a syntax tree of the word, and another word matching the word is recorded in the syntax tree. After obtaining the first command string currently displayed in the command line displaying area, the terminal may obtain, from the database according to a word that appears the first in the first command string, a syntax tree of the word, and then performs matching according to the syntax tree to obtain the first word set. For a process of obtaining, according to a syntax tree of each word, a word matching the word, refer to a related technology, and details are not described herein in this embodiment of the present application.

If the first command string includes a non-preset word, the terminal may obtain, from the database according to a preset string matching algorithm, the first word set matching the non-preset word in the first command string, where the preset word may be a word that is stored in the database of the terminal to form a command statement, a command parameter, and a value of the command parameter. The preset string matching algorithm may be a string matching algorithm based on a regular expression. The regular expression refers to a "rule string" formed according to some predefined specific characters and a combination of these specific characters. The "rule string" is used to indicate a filtering manner of a string. The string matching algorithm based on the regular expression may include the following.

(1) Match by initial: For example, when the first command string received by the terminal is c, the terminal may obtain, from the word stored in the database and according to a match-by-initial algorithm, a first word set using the first command string c as initials. The first word set may be create and change. Assuming that the terminal then receives a typed character h, the terminal can find the only word change according to the match-by-initial algorithm.

(2) Match by regular expression: According to the matching algorithm, the user needs to type a preset regular expression. For example, when the first command string received by the terminal is $ge (indicating a word ending with "ge"), the terminal may obtain, from the database according to the first command string, a first word set ending with "ge". The first word set may be change.

(3) Filter and match by letter: For example, when the first command string received by the terminal is e, the terminal may obtain, from the word stored in the database, a first word set including the first command string e. The first word set may be create and change. Assuming that the terminal then receives any one of typed characters h, n, or g, the terminal may find the only word change.

It should be noted that, in actual application, in addition to the multiple words that can form the command statement, the command parameter, and the value of the command parameter, the database may further store a word set obtained by the terminal according to a typed character received last time. If the terminal has already obtained the word set according to the typed character received last time, when the terminal receives the typed character again, the terminal may directly obtain, from the word set, the first word set matching the first command string. In addition, if the terminal does not obtain, from the database, a word matching the first command string, the terminal may further display preset error prompt information in the prompt information displaying area to prompt the user to check the typed character and determine whether to type again. For example, the preset error prompt information may be "Failed to obtain prompt information, and please type again."

Step 207: Determine whether a quantity of words that are included in the first word set is 1.

If the quantity of words that are included in the first word set is 1, step 208 is performed. If the quantity of words that are included in the first word set is not 1, step 210 is performed.

Step 208: Update the first command string with the word.

When the quantity of words that are included in the first word set obtained by the terminal is 1, the terminal may determine that the only word matching the first command string is obtained, and the terminal may update the first command string with the word, thereby assisting the user in typing, and greatly improving efficiency of typing a command statement. For example, it is assumed that the first command string obtained by the terminal from the current command line displaying area 21 is ch, and the first word set that is obtained by the terminal from the database and that matches the first command string ch is change. Because the quantity of words that are included in the first word set is 1, the terminal may update the first command string ch with the word.

Figure 2C:
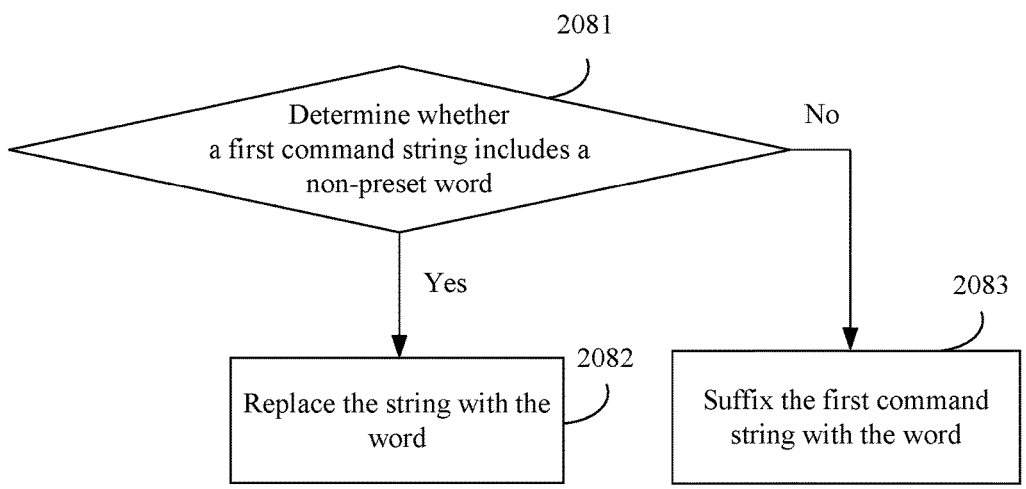
FIG. 2C is a flowchart of a method for updating a first command string according to an embodiment of the present application.

As shown in FIG. 2C, updating the first command string with the word may include the following steps.

Step 2081: Determine whether the first command string includes a non-preset word.

The preset word is the word prestored in the database. The terminal may first determine whether the first command string includes the non-preset word when the terminal updates the first command string with the obtained only word that matches the first command string. If the first command string includes the non-preset word, step 2082 is performed. If the first command string does not include the non-preset word, step 2083 is performed.

Step 2082: Replace the string with the word.

If the first command string includes the non-preset word, the terminal may replace the non-preset word with the only word included in the first word set. For example, it is assumed that the first command string obtained by the terminal from the current command line displaying area 21 is ch, and the first word set obtained by the terminal is change. Because the word stored in the database of the terminal does not include the word ch, the terminal may determine that the first command string ch is the non-preset word, and the terminal may replace the non-preset word ch with the word change. In this case, the updated first command string is change.

Step 2083: Suffix the first command string with the word.

If the first command string does not include the non-preset word, the terminal may suffix the first command string with the only word included in the first word set. For example, it is assumed that the first command string is change, and the first word set that is obtained by the terminal and that matches the first command string change is snmp. Because the word change in the first command string is the word stored in the database of the terminal, the terminal may determine that the first command string change does not include the non-preset word, and the terminal may suffix the first command string change with the only word snmp included in the first word set. In this case, the updated first command string is change snmp.

It should be noted that, in actual application, the terminal may directly replace the non-preset word with the only word if the only word included in the first word set is obtained by matching a non-preset word that appears the last in the first command string, or the terminal may directly suffix the first command string with the only word in order to update the first command string if the only word included in the first word set is obtained by matching according to a syntax tree of a preset word that appears the last in the first command string.

Therefore, according to the CLI displaying method provided in this embodiment of the present application, a user does not need to press a preset command matching key in a process of typing a command, and a terminal can automatically obtain, according to a command string displayed in a CLI, a word set matching the command string, and automatically update the command string, thereby simplifying steps of typing the command, and improving efficiency of typing the command.

Step 209: Display the updated first command string in the command line displaying area.

Figure 2D:
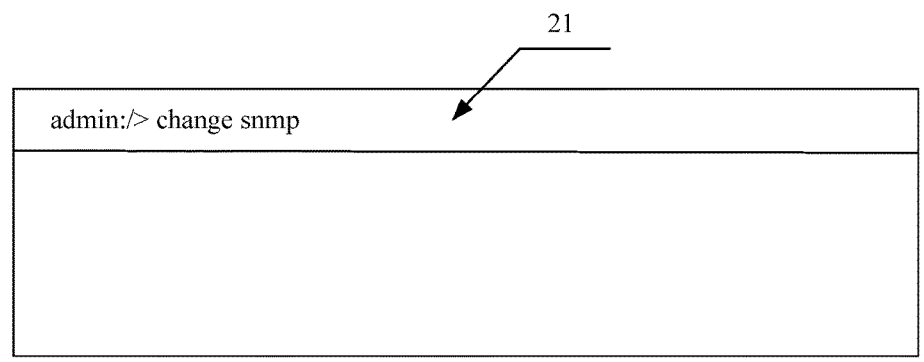
FIG. 2D is a schematic diagram of another CLI according to an embodiment of the present application.

For example, as shown in FIG. 2D, the updated first command string displayed in the command line displaying area 21 may be change snmp.

Then, the terminal may repeat the foregoing string updating process in step 205 to step 209, until the terminal determines, in step 207, that the quantity of words that are included in the first word set is not 1. For example, it is assumed that the terminal continues to perform step 205, and the obtained first command string currently displayed in the command line displaying area is change snmp. In step 206, the first word set that is obtained by the terminal from the database and that matches the first command string change snmp is version. In step 207, the terminal determines that the quantity of words that are included in the first word set is 1. Therefore, in step 208 suffix the first command string change snmp with the word version, and the updated first command string may be change snmp version. In this case, the terminal may perform step 209 and display the updated first command string change snmp version in the command line displaying area 21, and repeat the foregoing string updating process in step 205 to step 209 one more time. In step 205, the first command string that is obtained by the terminal and currently displayed in the command line displaying area 21 is change snmp version. In step 206, the first word set that is obtained by the terminal from the database and that matches the first command string change snmp version is v1v2c_switch=on and v1v2c_switch=off. In step 207, the terminal determines that the first word set, v1v2c_switch=on and v1v2c_switch=off, includes two words and the quantity of words is not 1. Therefore, the terminal stops performing the string updating process and performs step 210.

Step 210: Display the first word set in the prompt information displaying area.

Figure 2E:
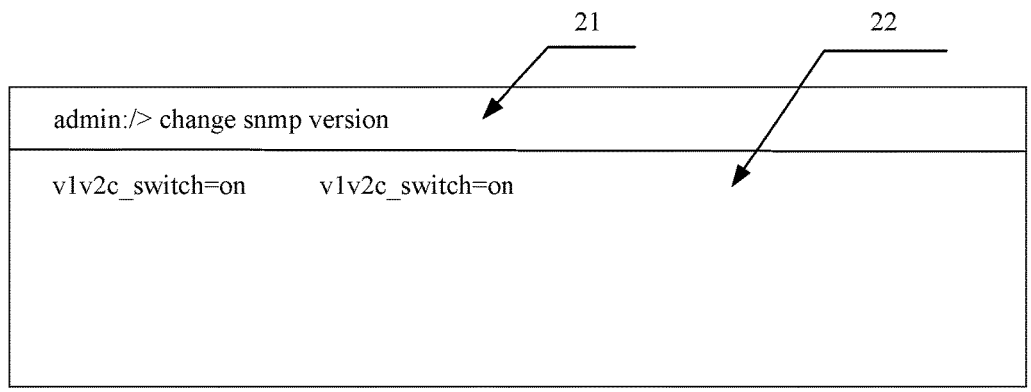
FIG. 2E is a schematic diagram of still another CLI according to an embodiment of the present application.

When the quantity of words that are included in the first word set is not 1, the terminal displays the first word set in the prompt information displaying area 22 in order to prompt the user to type. For example, it is assumed that the first command string is change snmp version, and the first word set that is obtained by the terminal from the database and that matches the first command string change snmp version is v1v2c_switch=on and v1v2c_switch=off. Because the first word set includes two words, and the quantity of words is not 1, as shown in FIG. 2E, the terminal may display the first word set v1v2c_switch=on and v1v2c_switch=off in the prompt information displaying area 22. The user may type a next character according to a prompt of the first word set.

Step 211: Execute a command indicated by the currently displayed command string.

When the typed character is the preset command execution character, the terminal may execute the command indicated by the currently displayed command string. For example, assuming that the preset command execution character in the terminal is "\n", after the user presses the Enter key, a character corresponding to the Enter key and that can be received by the terminal is the preset command execution character "\n". Assuming that a command string currently displayed in the command line displaying area is change snmp version v1v2c_switch=on, the terminal may execute a command indicated by the command string change snmp version v1v2c_switch=on.

Step 212: Display an execution result in the prompt information displaying area.

Figure 2F:
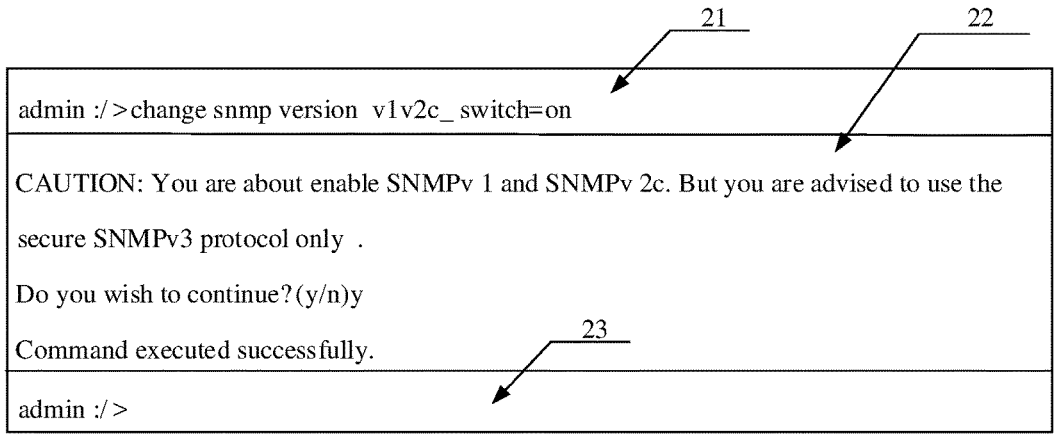
FIG. 2F is a schematic diagram of yet another CLI according to an embodiment of the present application.

In this embodiment of the present application, after executing the command indicated by the currently displayed command string, and generating the execution result, the terminal may send the execution result to the output buffering module, and may further display the execution result in the prompt information displaying area. For example, it is assumed that, after the terminal executes the command indicated by the command string change snmp version v1v2c_switch=on, a generated execution result is CAUTION: You are about to enable SNMPv1 and SNMPv2c. But you are advised to use the secure SNMPv3 protocol only. Do you wish to continue? (y/n)y Command executed successfully. The terminal may send the execution result to the output buffering module, and display the execution result in the prompt information displaying area 22, as shown in FIG. 2F.

It should be noted that, in actual application, after receiving the preset command execution character and executing the command indicated by the currently displayed command string, the terminal may send the execution result to the output buffering module and update the execution result to the prompt information displaying area. In this case, the terminal determines that an execution process of the command ends, and displays a command line displaying area and a prompt information displaying area that are corresponding to a next command. For example, as shown in FIG. 2F, the terminal may display a command line displaying area 23 and a prompt information displaying area (not shown) of a next command.

In conclusion, according to the CLI displaying method provided in this embodiment of the present application, in a process of typing a command, after receiving a typed character, a terminal can delete a character displayed in a prompt information displaying area, and display, in the prompt information displaying area, information obtained by processing a command string currently displayed in a command line displaying area. Therefore, content displayed in a CLI is simplified, and simplicity of the CLI is achieved.

It should be noted that a sequence of the steps of the CLI displaying method provided in this embodiment of the present application may be adjusted properly, or the steps may be added or reduced according to a situation. For example, step 202 and step 203 may be performed after step 211, or may be performed after a determining result of step 207 is that the quantity of words that are included in the first word set is not 1. Any modified method readily figured out by a person skilled in the art within the technical scope disclosed in the present application shall fall within the protection scope of the present application. Therefore, details are not described.

Figure 3A:
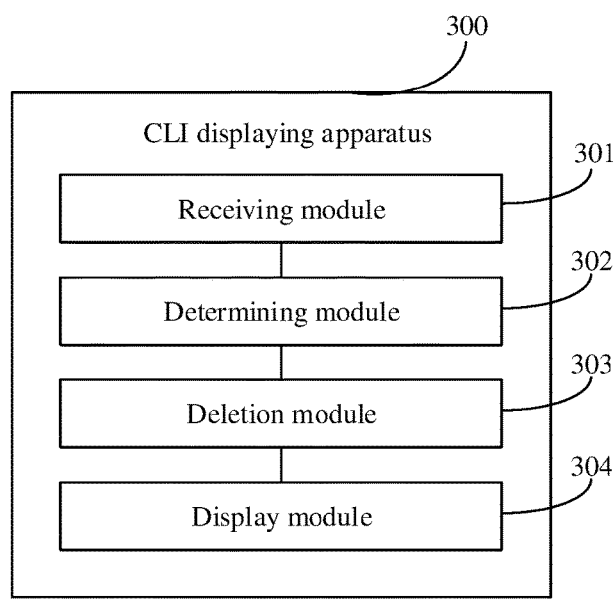
FIG. 3A is a schematic structural diagram of a CLI displaying apparatus according to an embodiment of the present application.

An embodiment of the present application provides a CLI displaying apparatus 300. As shown in FIG. 3A, the CLI displaying apparatus 300 includes a receiving module 301, a determining module 302, a deletion module 303, and a display module 304.

The receiving module 301 is configured to receive a typed character.

The determining module 302 is configured to determine whether a character is displayed in a prompt information displaying area.

The deletion module 303 is configured to delete the character displayed in the prompt information displaying area when the character is displayed in the prompt information displaying area.

The display module 304 is configured to display, in the prompt information displaying area, information obtained by processing a command string currently displayed in a command line displaying area.

In conclusion, according to the CLI displaying apparatus 300 provided in this embodiment of the present application, in a process of typing a command, after receiving a typed character, a terminal can delete a character displayed in a prompt information displaying area, and display, in the prompt information displaying area, information obtained by processing a command string currently displayed in a command line displaying area. Therefore, content displayed in a CLI is simplified, and simplicity of the CLI is achieved.

Figure 3B:
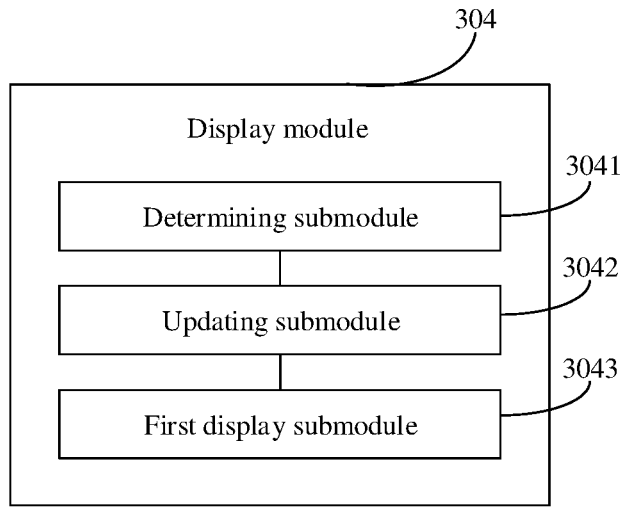
FIG. 3B is a schematic structural diagram of a display module according to an embodiment of the present application.

Optionally, as shown in FIG. 3B, the display module 304 includes a determining submodule 3041, an updating submodule 3042, and a first display submodule 3043.

The determining submodule 3041 is configured to determine whether the typed character is a preset command execution character.

The updating submodule 3042 is configured to execute a string updating process when the typed character is not the preset command execution character, where the string updating process includes obtaining a first command string currently displayed in the command line displaying area, obtaining, from a database, a first word set matching the first command string, determining whether a quantity of words that are included in the first word set is 1, updating the first command string with the word if the quantity of words that are in the first word set is 1, displaying the updated first command string in the command line displaying area, and repeat the string updating process, until the quantity of words that are included in the first word set is not 1.

The first display submodule 3043 is configured to display the first word set in the prompt information displaying area.

Optionally, the updating submodule 3042 is further configured to determine whether the first command string includes a non-preset word, where the preset word is a word prestored in the database, replace the non-preset word with the word if the first command string includes the non-preset word, and suffix the first command string with the word if the first command string does not include the non-preset word.

Figure 3C:
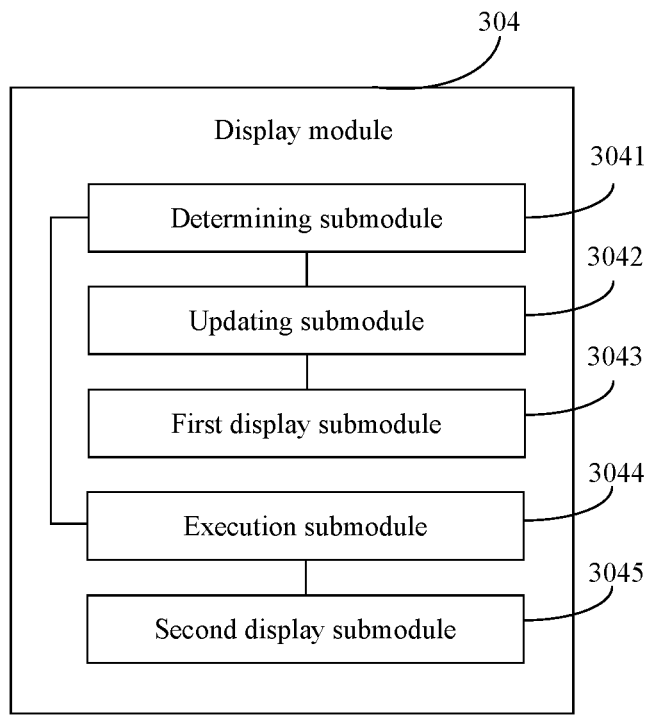
FIG. 3C is a schematic structural diagram of another display module according to an embodiment of the present application.

Optionally, as shown in FIG. 3C, the display module 304 further includes a determining submodule 3041, an updating submodule 3042, a first display submodule 3043, an execution submodule 3044, and a second display submodule 3045.

The determining submodule 3041 is configured to determine whether the typed character is a preset command execution character.

The updating submodule 3042 is configured to execute a string updating process when the typed character is not the preset command execution character, where the string updating process includes obtaining a first command string currently displayed in the command line displaying area, obtaining, from a database, a first word set matching the first command string, determining whether a quantity of words that are included in the first word set is 1, updating the first command string with the word if the quantity of words that are in the first word set is 1, displaying the updated first command string in the command line displaying area, and repeat the string updating process, until the quantity of words that are included in the first word set is not 1.

The first display submodule 3043 is configured to display the first word set in the prompt information displaying area.

The execution submodule 3044 is configured to execute a command indicated by the currently displayed command string when the typed character is the preset command execution character.

The second display submodule 3045 is configured to display an execution result in the prompt information displaying area.

In conclusion, according to the CLI displaying apparatus 300 provided in this embodiment of the present application, in a process of typing a command, after receiving a typed character, a terminal can delete a character displayed in a prompt information displaying area, and display, in the prompt information displaying area, information obtained by processing a command string currently displayed in a command line displaying area. Therefore, content displayed in a CLI is simplified, and simplicity of the CLI is achieved.

Figure 4:
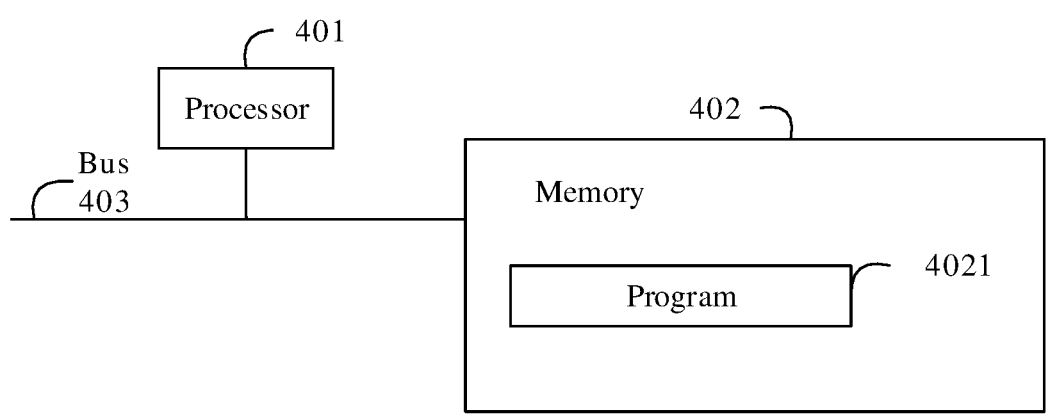
FIG. 4 is a schematic structural diagram of another CLI displaying apparatus according to an embodiment of the present application.

An embodiment of the present application provides another CLI displaying apparatus. As shown in FIG. 4, the CLI displaying apparatus includes a processor 401, a memory 402, and a bus 403. The bus 403 is configured to connect the processor 401 and the memory 402. The processor 401 is configured to execute a program 4021 stored in the memory 402.

The processor 401 is configured to receive a typed character.

The processor 401 is further configured to determine whether a character is displayed in a prompt information displaying area.

The processor 401 is further configured to delete the character displayed in the prompt information displaying area if the character is displayed in the prompt information displaying area.

The processor 401 is further configured to display, in the prompt information displaying area, information obtained by processing a command string currently displayed in a command line displaying area.

Optionally, the processor 401 is further configured to determine whether the typed character is a preset command execution character, execute a string updating process when the typed character is not the preset command execution character, where the string updating process includes obtaining a first command string currently displayed in the command line displaying area, obtaining, from a database, a first word set matching the first command string, determining whether a quantity of words that are included in the first word set is 1, updating the first command string with the word if the quantity of words that are in the first word set is 1, displaying the updated first command string in the command line displaying area, repeat the string updating process, until the quantity of words that are included in the first word set is not 1, and display the first word set in the prompt information displaying area.

Optionally, displaying the updated first command string in the command line displaying area includes determining whether the first command string includes a non-preset word, where the preset word is a word prestored in the database, replacing the non-preset word with the word if the first command string includes the non-preset word, and suffixing the first command string with the word if the first command string does not include the non-preset word.

Optionally, the processor 401 is further configured to execute a command indicated by the currently displayed command string when the typed character is the preset command execution character, and display an execution result in the prompt information displaying area.

In conclusion, according to the CLI displaying apparatus provided in this embodiment of the present application, in a process of typing a command, after receiving a typed character, a terminal can delete a character displayed in a prompt information displaying area, and display, in the prompt information displaying area, information obtained by processing a command string currently displayed in a command line displaying area. Therefore, content displayed in a CLI is simplified, and simplicity of the CLI is achieved.

It may be clearly understood by a person skilled in the art that, for the purpose of convenient and brief description, for a detailed working process of the foregoing apparatus and unit, reference may be made to a corresponding process in the foregoing method embodiments, and details are not described herein.

The foregoing descriptions are merely examples of embodiments of the present application, but are not intended to limit the present application. Any modification, equivalent replacement, and improvement made without departing from the spirit and principle of the present application shall fall within the protection scope of the present application.

What is claimed is:

1. A command-line interface (CLI) displaying method implemented by a client, the CLI displaying method comprising:
    receiving a typed character;
    determining, in response to the receiving, whether a character is displayed in a prompt information displaying area;
    deleting the character from the prompt information displaying area in response to determining that the character is displayed in the prompt information displaying area;
    processing a command string displayed in a command line displaying area when the typed character is a preset command execution character; and
    displaying a processing result in the prompt information displaying area.

2. The method of claim 1, further comprising executing a string updating process when the typed character is not the preset command execution character by:
    obtaining the command string displayed in the command line displaying area;
    obtaining a word set matching the command string from a database;
    updating the command string with a word to create an updated command string when a quantity of words comprised in the word set is one; and
    displaying the updated command string in the command line displaying area,
    wherein the method further comprises:
        repeating the string updating process until the quantity is not one; and
        displaying the word set in the prompt information displaying area.

3. The method of claim 2, wherein updating the command string with the word comprises:
    replacing the word in the command string with a word in the word set when the word in the command string is not a preset word, wherein the preset word is pre-stored in the database; and
    suffixing the command string with the word in the word set when the word in the command string is the preset word.

4. A command-line interface (CLI) displaying apparatus comprising:
    a memory; and
    a processor coupled to the memory and configured to:
        receive a typed character;
        determine, in response to the receiving, whether a character is displayed in a prompt information displaying area;
        delete the character from the prompt information displaying area in response to determining that the character is displayed in the prompt information displaying area;
        process a command string displayed in a command line displaying area when the typed character is a preset command execution character; and
        display a processing result in the prompt information displaying area.

5. The CLI displaying apparatus of claim 4, wherein the processor is further configured to execute a string updating process when the typed character is not the preset command execution character by:
    obtaining the command string displayed in the command line displaying area;
    obtaining a word set matching the command string from a database;
    updating the command string with a word to create an updated command string when a quantity of words in the word set is one; and
    displaying the updated command string in the command line displaying area, and
    wherein the processor is further configured to:
        repeat the string updating process until the quantity is not one; and
        display the word set in the prompt information displaying area.

6. The CLI displaying apparatus of claim 5, wherein the processor is further configured to:
    replace the word in the command string with a word in the word set when the word in the command string is not a preset word, wherein the preset word is pre-stored in the database; and
    suffix the command string with the word in the word set when the word in the command string is the preset word.

7. A client comprising:
    a command-line interface (CLI) comprising a prompt information displaying area and a command line displaying area; and
    a processor configured to:
        receive a typed character;
        determine, in response to the receiving, whether a character is displayed in the prompt information displaying area;
        delete the character from the prompt information displaying area in response to determining that the character is displayed in the prompt information displaying area;
        process a command string displayed in the command line displaying area when the typed character is a preset command execution character; and
        display a processing result in the prompt information displaying area.

8. The client of claim 7, wherein the processor is further configured to execute a string updating process when the typed character is not the preset command execution character by:
    obtaining the command string displayed in the command line displaying area;
    obtaining a word set matching the command string from a database;

updating the command string with a word to create an updated command string when a quantity of words comprised in the word set is one; and displaying the updated command string in the command line displaying area, and wherein the processor is further configured to:

repeat the string updating process until the quantity is not one; and display the word set in the prompt information displaying area.

9. The client of claim 8, wherein the processor is further configured to:

replace the word in the command string with a word in the word set when the word in the command string is not a preset word, wherein the preset word is pre-stored in the database; and suffix the command string with the word in the word set when the word in the command string is the preset word.

* * * * *